INVENTOR
JAMES CLARK

BY Stevens, Davis, Miller & Mosher
ATTORNEYS

INVENTOR
JAMES CLARK

BY Stevens, Davis, Miller & Mosher
ATTORNEYS

INVENTOR
JAMES CLARK
BY Stevens, Davis, Miller & Mosher
ATTORNEYS 3,510,094

METHOD AND MEANS FOR REDUCING THE SKIN FRICTION OF BODIES MOVING IN A FLUID MEDIUM

James Clark, 160 Devonhurst Drive, Apt. C., Dayton, Ohio 45429

Continuation-in-part of application Ser. No. 457,394, May 20, 1965. This application Dec. 11, 1967, Ser. No. 689,434
Int. Cl. B63b *1/34;* B64c *3/36*
U.S. Cl. 244—130 17 Claims

ABSTRACT OF THE DISCLOSURE

A system for reducing the skin friction of aerodynamic bodies and the like incorporating a layer of either alpha or beta emitting radioactive material upon the outer surface of the body, covering the radioactive material with a material having semiconductor properties, and controlling the alpha or beta emissions by varying the electric bias on the semiconductor material. The semiconductor layer may be configured as a diode, triode, F.E.T., and the like.

REFERENCE TO OTHER PATENT APPLICATIONS

This is a continuation-in-part patent application of my co-pending patent application bearing Ser. No. 457,394, filed May 20, 1965, entitled "Method and Apparatus for Energy Transfer."

BACKGROUND OF THE INVENTION

The use of radioactive coatings on the skins of aerodynamic bodies for the purpose of reducing drag during operation of the aircraft is not new. Such techniques have been known since the 1940's as evidenced by British Pat. No. 635,784. However, notwithstanding the general knowledge of this phenomenon, many technical problems continue to exist in connection with its practical application and for this reason the intended use of the phenomenon has not been generally accepted by the industry.

One serious problem experienced in applying radioactive material to effect drag reduction is that heretofore there has been no effective and practical technique in controlling the magnitude and energy level of radioactive emissions. For example, it will be understood that when the aircraft is on the ground or when it is low flying at relatively low speeds, there is no need for drag reduction but with the arrangement disclosed in the aforementioned British patent, there is a high level of beta emission which would interfere with various electronic equipment and communication systems in at least the immediate vicinity.

It is a primary purpose of the present invention to provide a means and method of overcoming the aforementioned problem by effectively controlling the magnitude and energy level or radioactive emissions so that when the aircraft is on the ground or low flying radioactive emissions are substantially entirely suppressed; however, when the aircraft is high flying at high speeds, radioactive emissions are increased so as to effectively reduce the drag characteristics of the aircraft. To accomplish this result according to the invention, there is provided at least one layer of semiconductor material as a covering over the radioactive material and by means of electrically forward biasing to various degrees or back biasing the semiconductor material, radioactive emissions penetrating and emitting from the semiconductor material are thereby controlled. The semiconductor layer may be configured as a diode, triode, F.E.T. or the like.

In addition to the above problem, prior to this time, it was generally believed that the radioactive material effectively reduced the drag characteristics of aircraft by ionizing the boundary layer at the fluid-solid interface and at the same time inducing a repelling or attractive force on these ions by establishing electric charges and electric charge fields on the surface of the aerodynamic body. However, it has been discovered recently that ionization has but an ancillary effect in regard to drag reduction and that efficient drag reduction is primarily related to the radioactive excitation of molecules at the fluid-solid interface. Therefore, it is predominantly these excited molecules that cause most of the reduction in drag for the aerodynamic body. With this discovery in mind, the present invention, which provides alpha emitting or beta emitting material as a source of drag reducing energy, controls the drag characteristics of the aircraft by varying the available excitation energy of the radioactive emissions. One aspect of the invention concerns the control of the energy level and number of alpha or beta particle emissions to change the fluid characteristics. Another aspect concerns variation of crystal lattice characteristics to provide a controlled interaction with the adjacent bombarded fluid flow.

It is therefore an object of the invention to provide an effective means and method for reducing the skin friction of aerodynamic bodies and the like that avoids the problems and achieves the technical advantages outlined above.

Other and further objects of the invention will become apparent with the following detailed description when taken in view of the appended drawings wherein like characters refer to like structures throughout the various figures wherein.

DETAILED DESCRIPTION OF THE EMBODIMENTS

Figure 1:
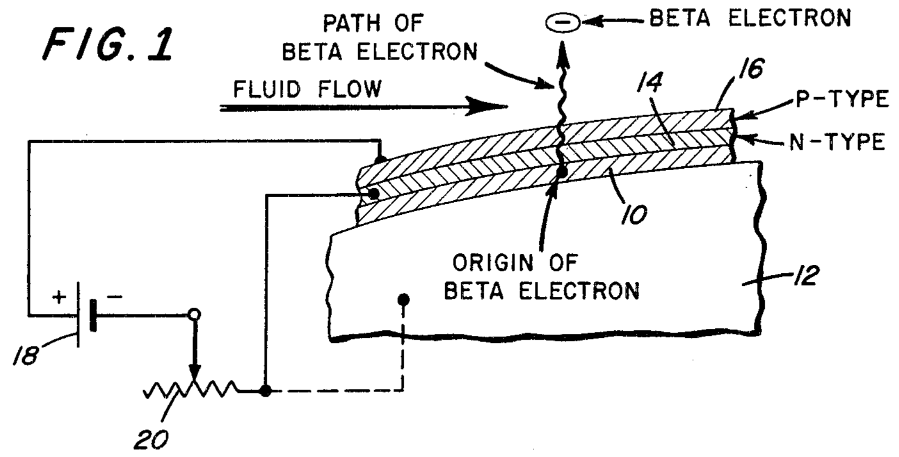
FIG. 1 is a diagrammatic illustration of a vertical section through one embodiment of the invention.

This invention is based on the use of alpha and beta particle emission from radioactive isotopes to excite vibrational and rotational modes in the fluid molecules adjacent to the surface of an aerodynamic or hydrodynamic body and includes means for controlling the magnitude and number of alpha or beta particles emitted into the fluid flow. It is known to the art that alpha and beta emission from a radioactive isotope may be used to ionize the fluid flow about an aerodynamic body and thereby change its local viscosity or aerodynamic or hydrodynamic drag. However, I have discovered that the excitation of vibrational and rotational states in the fluid molecules is much more effective in changing the viscosity or skin friction drag in the air or fluid flow adjacent to an aerodynamic or hydrodynamic body and that both alpha and beta particles produce a much greater number of vibrationally or rotationally excited fluid molecules than they do ions.

The control of the skin friction drag according to the invention is accomplished by varying the energy level and number of alpha or beta particles bombarding a unit volume of the fluid adjacent to the aero- or hydrodynamic surface per unit time. This control of the energy level and number of bombarding particles is accomplished electrically by the use of semiconductor principles as described below. The use of diode and triode type semiconductor junctions and field effect principles is described.

Before describing exampled embodiments of the invention, the manner in which these particles expend their energy in passing through a crystal lattice is briefly described. It is well known that the energy losses accompanying the passage of charged high-energy particles through crystal lattices are almost completely due to the excitation of bound electrons in the crystal lattice. The excitation of these bound electrons results in the following phenomena:

(1) The creation of ion pairs or ionization within the crystal lattice. This results in the generation of electrons and holes within the conduction band in semiconductors.

(2) The generation of electromagnetic Bremsstrahlung radiation.

(3) The excitation of crystal lattice vibrations.

Recent research indicates the major part of the energy of the alpha or beta particle is expended in ionization or the creation of electron-hole pairs in the conduction band of semiconductor materials (for example, germanium, silicon and gallium arsenide). The mobility of these electrons and holes in the semiconductor lattice is such that they are immediately swept up to a reverse biased P-N junction and appear as a voltage drop across the P-N barrier.

Other recent research indicates a thin (1–20 A.) crystal lattice film may be successfully evaporated over a film of an alpha emitting radioactive isotope and still permit the passage of the alpha particles through the film without an excessive breakdown of the film.

The fundamental aspects of this invention concern the interaction of the electrically charged beta or alpha particles with the potential gradients and electric fields associated with the electrons and holes in semiconductor materials. Since the size of the beta or alpha particle is such that it can pass through thin layers of a crystal lattice structure without seriously damaging it, this interaction is used to control their migration characteristics through the crystal lattice.

With reference to FIG. 1, one example of the invention will now be described in detail. In one example, beta emitting radioactive material 10 is attached or bonded to the surface of the aerodynamic body 12 by electroplating, high vacuum vapor deposition, alloying with the surface, ionic bombardment, cementing or any other means known to the art. For high electron conductivity through the semiconductor materials, the outer surface of the radioactive material is coated with an N-type semiconductor layer 14 which is in turn coated with a P-type layer 16 to form a P-N junction diode. Layers 14 and 16 are preferably formed of suitably doped semiconductor materials known in the art. This P-N type diode junction is "forward-biased" by a battery 18 or other suitable electric power. If it is desirable to ground or electrically connect the P-N type diode junction to the aerodynamic body 12, the electric connection (shown by the dotted line in FIG. 1) may be employed. The P-N junction type diode arrangement with a "forward-bias" gives maximum control of the passage of the beta electrons emitted from the radioactive material and migrating through the P-N junction. By adjusting the "forward-bias" applied to the P-N semiconductor junction by means of a rheostat 20 or other means of current control, the beta electron emission into the fluid flow is varied from near saturation of the semiconductor materials down to near the cut-off current of the P-N junction.

Not all of the beta electrons migrate across the P–N junction even for maximum forward biasing since some of these high velocity, or "hot-electrons," in the conduction band of semiconductor material, cause the excitation of bound electrons in the crystal lattice structure. Most of this energy is expended in the formation of ion pairs or an electron and associated hole in the crystal lattice in the conduction band. In a forward-biased P–N junction, this migrating action takes the form of an additional circulating current across the P–N junction. In a reverse-biased P–N junction, these electron and hole pairs collect as space charges at the junction and may be measured as a potential across the junction.

Because of the interaction of the beta electrons with the bound electrons in the crystal lattice structure, the energy level and number of beta electrons leaving the outer surface of the P-type semiconductor material and escaping into the fluid flow as shown in FIG. 1 may be initially set in discrete steps by varying the thickness of the P- and N-type semiconductor coatings. With average conditions so established, the energy level and number of the beta electrons crossing the P–N junction is controlled by varying the electric bias across this junction and thereby varying the potential gradient or barrier height which they must surmount in migrating across this junction. Thus some of the beta electrons which have lost more energy than others, by interactions with bound electrons in the crystal lattice structure, will not have sufficient energy left to surmount the potential gradient or barrier height across the P–N junction. By varying the electric bias across the P–N junction, the number of these lower energy electrons migrating across the junction may be controlled.

A further factor affecting the energy level of these "hot" beta electrons is the establishment of an appreciable space-charge region on each side of and near the P–N junction which exerts long-range type electric field forces on the higher velocity "hot" electrons. The forces exerted on the emerging beta electron as it leaves the outer surface of the P-type semiconductor material as shown in FIG. 1 may be established by conditioning the surface work function of the semiconductor material by conventional "surface states" techniques or other means known to the art.

With primary emission control being achieved by means of the electrical bias, emission of beta electrons can be reduced substantially to zero by back-biasing the P–N junction. In this way, all normal migration of normal conduction electrons is cut off by the very steep potential gradient across the P–N junction. Any "hot" or fast electrons which surmount this gradient or potential barrier will have their energy levels appreciably reduced.

In the example depicted in FIG. 1, the control of a negative beta particle (electron) is described. To those acquainted with the semiconductor art, it will be apparent that the control of positive beta particles (positrons) may be treated as the migration of holes in semiconductor materials. For positrons, the P or N semiconductor material and the polarity of the electric bias connections are just the opposite for that of the negative beta particles (electrons) as described.

The P–N diode junction shown in FIG. 1 may be grounded or connected to the aero- or hydrodynamic body if necessary as shown by the dotted line in these figures. This junction may also be electrically insulated from the body by either employing a radioactive material which is an electric insulator or by using an insulating material between the radioactive material and the body, or by other means known to the art. In some cases, a radiation absorbing layer (not shown) may be employed between the radioactive isotope layer and the body surface 12.

Figure 2:
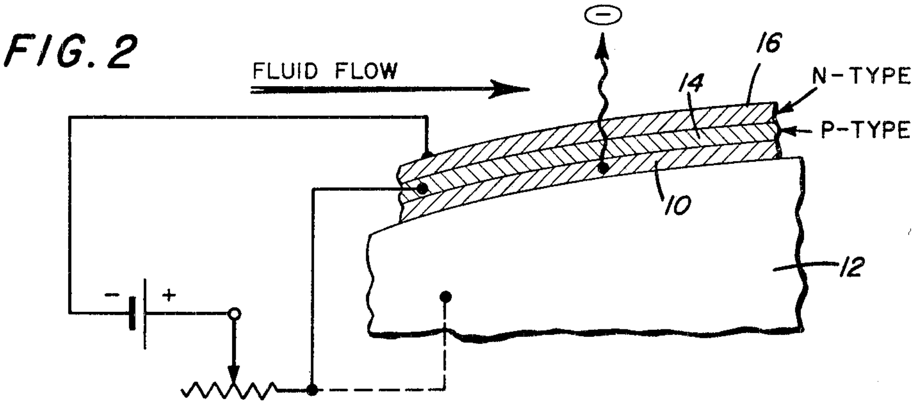
FIGS. 2–4, 7 and 10–12 are figures similar to FIG. 1 illustrating further embodiments of the invention.

Another example of the invention for controlling the energy level and consequently the number of beta electrons migrating across the semiconductor diode junction is by the use of an N–P diode junction as shown in FIG. 2. In this embodiment it is seen the top of the radioactive material 10 is coated with a P-type semiconductor material 14 which in turn is coated with an N-type semiconductor material 16 forming an N–P type diode junction between the fluid flow over the body and the layer of radioactive material on the body surface. This arrangement is "forward-biased" when battery 18 has the positive side coupled to layer 14, but the direction of the biasing electron flow across the N–P diode junction is in a direction against the migration of the beta electrons across this junction. The N–P diode junction may be connected electrically to the body if desired by the lead shown as a dotted line in FIG. 2. This diode junction may also be electrically insulated from the body as described above.

In the N–P diode junction shown in FIG. 2, part of the beta electrons emitted from the radioactive material are attracted to the positive holes in the P-type material and are thereby neutralized, thus reducing the total electron flow. Other beta electrons have their migration velocity reduced by the attractive field forces from the various slower moving hole sites. When they approach the N–P junction they will be subjected to a counter flow of bias electrons which further reduces their migration velocity. When the beta electrons across the N–P junction, they are subjected to long range repulsive field forces from N-type sites in the N-type semiconductor material. Appropriate "surface states" may be used to further increase the surface work function which the escaping beta electron must surmount before it escapes into the gas flow. These various parameters may be varied to change and control the energy level and number of beta electrons bombarding the fluid flow about the body.

It will be understood by those skilled in the art that whenever the semiconductor layers are illuminated with light including proper wave lengths, a static electrical bias may be established across the junction which should be accounted for when selecting the P-N arrangement relative the direction of illumination as well as the bias ranges provided by battery 18 and rheostat 20.

Figure 3:
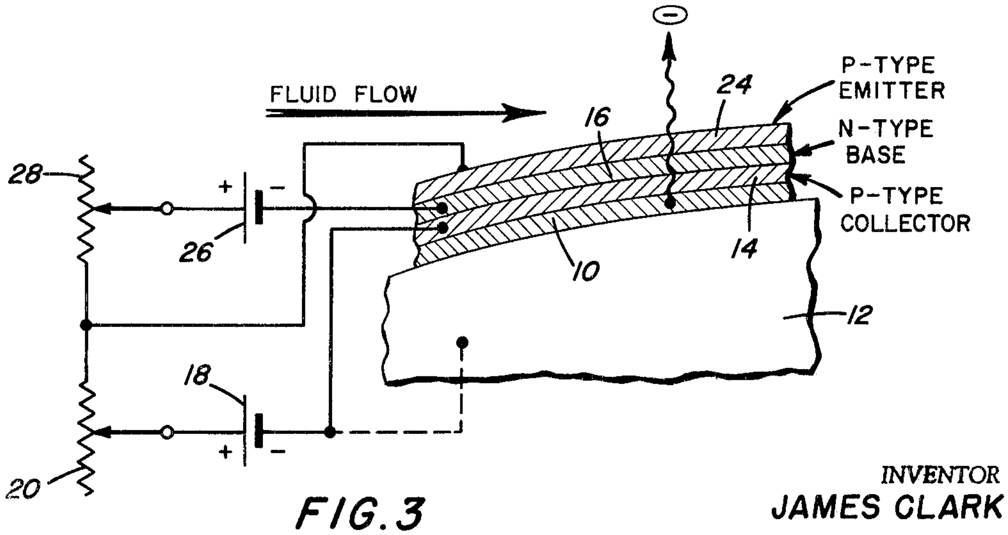
Figures 4, 5, 6:
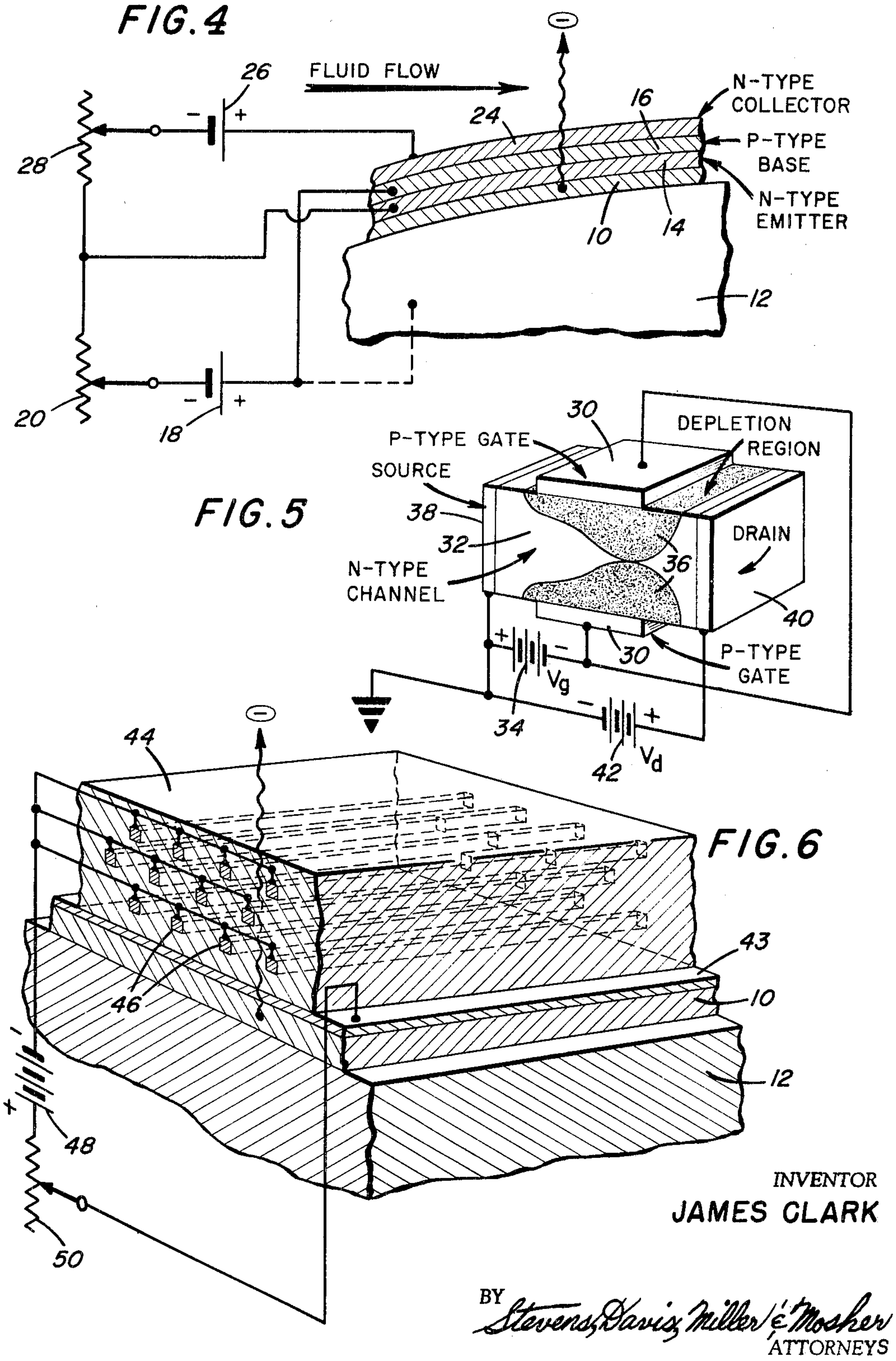
FIG. 5 and 6 are perspective illustrations with parts broken away of other embodiments of the invention employing field effect principles.

A further embodiment of the invention shown in FIGS. 3 and 4 comprises three or more layers of alterating types of semiconductor material covering the radioactive material and connected and biased to form transistor configurations which afford a wider and more flexible control range of beta electron flow than can be obtained with the above-described diode type junction. Each configuration is formed by a P-N-P or N-P-N junction arrangement of semiconductor coatings over the radioactive material with forward and reverse biasing of the semiconductor layers. A P-N-P junction arrangement with forward biasing is shown in FIG. 3. Again, beta emitting radioactive material 10 covers the surface of body 12. P-N-P junctions are formed by layers of semiconductor material 14, 16, and 24. Electrical biasing and variable control are obtained by batteries 18, 26 and potentiometers 20, 28 connected generally as shown by the unnumbered leads.

When using multiple layer semiconductor junctions such as that shown in FIG. 3 care must be taken to assure that the total thickness of the semiconductor layers is not sufficient to completely block all of the beta electron flow. In FIG. 3 it is seen that the direction of the bias and conduction electron flow from the batteries through the layers of semiconductor materials is in the same direction as the beta electron flow and that this transistor assembly has a forward bias. With this arrangement a wide range in the energy level and number of beta electrons emitted into the fluid flow about the body is obtained by individually varying the bias and conduction electron flows. The above description of the diode junctions regarding grounding or electrically insulating the transistor assembly from the body and the above description regarding the various forces and interactions encountered by the beta electrons during their migration through the various semiconductor layers of the diode arrangement are also applicable to the arrangement shown in FIG. 3.

The characteristics of the N-P-N transistor may also be used to obtain a wide range of energy level and number of beta electrons emitted into the fluid flow. This transistor arrangement is shown in FIG. 4. In this figure it is also seen that the direction of the bias and conduction electrons is in the same direction through the semiconductor layers as the beta electrons so that forces and interactions encountered by the beta electrons during their migration through the semiconductor are the same as described for the embodiment depicted in FIG. 2.

By using a P-N-P junction transistor structure, the emitter and base are farthest away from the radioactive source of the beta electrons, (see FIG. 3) while in the N-P-N structure the emitter and base are adjacent to the radioactive material (see FIG. 4). It should be noted that any one of the three semiconductor layers of the transistor assembly may be electrically connected to the body as necessary to obtain the desired performance characteristics. In FIGS. 3 and 4 the transistor assembly may be either forward or reverse biased to obtain a wide range of performance characteristics. The principle of operation of these embodiments is generally the same. If desired, the emitter-base-collector arrangement of FIGS. 3 and 4 may be designed to establish electron flow opposite the emission direction of the "hot" beta electrons.

A further embodiment of the invention includes a covering for the radioactive layer configured and biased to form a junction field-effect transistor (F.E.T.). Before describing this embodiment in detail, the basic operational principles for the F.E.T. will be reviewed. A typical F.E.T., diagrammatically illustrated in FIG. 5, includes a pair of P-type gates 30 about an N-type channel 32 and biased by battery 34 ($V_g$) to form depletion regions 36 between the source 38 and drain 40. Electron flow established by battery 42 ($V_d$) between the source and drain is controlled by the value of battery 34. Thus, if $V_g$ is great enough to reach the "pinch-off" level, the channel is blocked by regions 36 and source-drain current stops. If $V_g$ is below pinch-off, channel 32 is open to electron flow.

In the invention (FIG. 6), a source electrode layer 43 of ohmic conducting material such as copper or silver is provided over the layer of radioactive material 10, which in this example is beta emitting. A layer of bulk N-type material 44 covers the source electrode 43 and is in ohmic contact therewith. Gates are formed by a plurality of elongated zones 46 of P-type material extending through the N-material preferably in a generally parallel arrangement. Zones 46 are spaced from each other a distance suitable to close by depletion region expansion the N-channels defined therebetween. The source electrode 43 for the biasing voltage may comprise a thin evaporated metallic film as shown or the layer of radioactive material may be used, depending on its electrical resistivity. Large areas of surfaces coated with a radioactive material may be covered with this field-effect transistor arrangement by using conventional vacuum evaporation and masking techniques. gate bias is provided by battery 48 and potentiometer 50 coupled from the source to the P-type gate electrodes generally as shown. Since the source-drain current being controlled is in the form of beta emissions from layer 10, the drain electrode may be omitted.

In operation, beta electrons migrate from layer 10 through the N-channels of layer 44 and escape into the fluid ambient (drain) at the outer face thereof. Control of the number and rate of beta emissions to the fluid is effected by adjustment of potentiometer 50 to the extent that when the pinch-off voltage level is reached practically all beta emission to the fluid is stopped.

Figure 7:
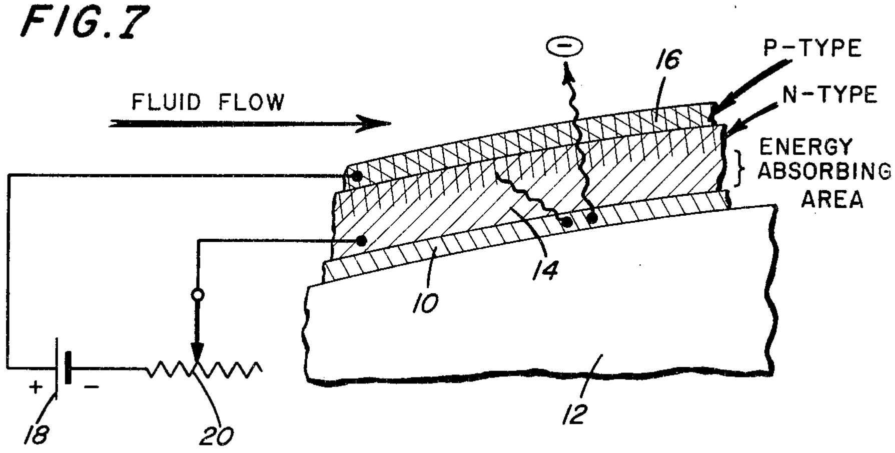

A further embodiment of the invention is shown in FIG. 7. In some applications it is desirable to have an emission of beta particles into the air or liquid flow having the same energy level and unidirectional paths. Since the beta emission from radioactive materials has an omnidirectional pattern, it is necessary to absorb those portions of it which are not emitted in the desired direction. Some guiding or collimating action may be imparted to low energy beta particles by directing their path at certain angles relative to the crystal axes of oriented crystal lattices. A selective absorption of the energy of these particles is obtained by first passing them through an energy absorbing area of the crystal lattice as shown in FIG. 7. The crystal configuration necessary to provide the energy absorbing function is conventional and need not be described here. The material in this area should have good annealing properties to dislocations caused by alpha or beta bombardment. A fine control of the energy level of these charged particles is obtained by varying the electric bias on the N-P junction as shown. This energy absorption and collimating action may be used with either diode or transistor assemblies described above. The guiding or collimating action is most effective at the lower energy levels of the charged particles.

Figure 8:
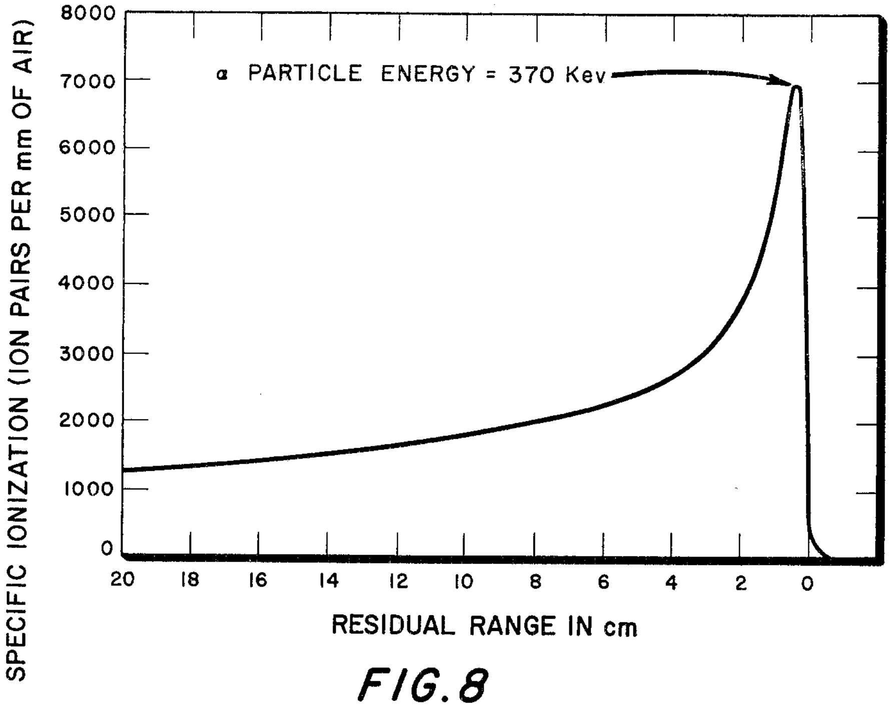
FIG. 8 illustrates a Bragg chart.

The foregoing examples have beta emitting material as a radioactive source; however, this invention also includes drag reduction control using alpha emitting radioactive material. An alpha particle emitted from radioactive isotopes is a helium nucleus having a positive electric charge which is twice that of an electron at rest. These alpha particles have a rest mass of 4.0, while the beta electron or positron has a rest mass of 0.0005486. Alpha particles because of their large mass tend to travel in a straight line through a crystal lattice structure, while the lighter electrons are subject to angular deviations from their original path through a crystal lattice. When using semi-conductor coatings over an alpha emitting radioactive source to control the energy level and number of alpha particles migrating through the semiconductor lattice structure, it is desirable to use materials having a high annealing rate for avoiding alpha-induced defects. The control layers should also have loosely-packed lattice configurations. Since an alpha particle has a positive electric charge, its migration across semiconductor junctions is affected by varying the height of the potential barrier across the junction and by controlling the energy loss of the alpha particle as it passes through the semiconductor lattice structure. The point at which it creates maximum ionization or excitation of electronic, vibrational and rotational molecular states in the boundary layer fluid flow about the body may be accurately controlled. FIG. 8 shows a Bragg curve which indicates the number of ion pairs formed by an alpha particle in air during its deceleration and decay. It is seen that the maximum number of ions are formed when the alpha particle has an energy level of 370 kev. Since the peak on this curve is very sharp, it indicates the region in the boundary layer flow having maximum ionization, and consequently maximum change in viscosity, or aerodynamic drag due to ionization, is aproximately 0.5 cm. thick.

By changing the electric bias on a junction diode or transistor assembly through which the alpha particles are migrating, this point of maximum ionization, or change in viscosity of the airflow fay be located at the interface between the gas molecules and the surface of the semiconductor coating on the aerodynamic body or at any other desired point within the initial alpha particle range.

This technique is used in the invention to control and locate the point of maximum molecular excitation in the airflow relative to the surface of the aerodynamic body. In the following chart it is seen that only 0.42 of the alpha particle's energy is used in ionizing the $N_2$ molecules, and only 0.38 of the energy is used in ionizing the $O_2$ molecules. The major portion of the remaining alpha particle's energy is used in exciting electronic, vibrational and rotational states in the gas molecules.

AVERAGE ENERGY LOST BY ALPHA PARTICLES IN PRODUCING ONE ION PAIR IN VARIOUS GASES

| Gas | Energy per ion pair W (eV.) | First ionization potential I (eV.) | Fraction of the energy used in ionization (I/W) |
|---|---|---|---|
| $H_2$ | 36.3 | 15.6 | 0.43 |
| He (very pure) | 43 | 24.5 | 0.58 |
| He (tank) | 30 | | |
| $N_2$ | 36.5 | 15.5 | 0.42 |
| $O_2$ | 32.5 | 12.5 | 0.38 |
| Air | 35.0 | | |
| Ne (very pure) | 36.8 | 21.5 | 0.58 |
| Ne (tank) | 28 | | |
| Ar | 26.4 | 15.7 | 0.59 |
| Kr | 24.1 | 13.9 | 0.58 |
| Xe | 21.9 | 12.1 | 0.55 |
| $CH_4$ | 30 | 14.5 | 0.48 |
| $C_2H_4$ | 29 | 10.5 | 0.36 |
| CO | 34 | 14.3 | 0.42 |
| $CO_2$ | 34 | | |
| $CS_2$ | 26 | 10.4 | 0.40 |
| $CCl_4$ | 27 | | |
| $NH_3$ | 39 | 10.8 | 0.28 |

Only a small amount of the alpha particle energy is required to excite the various molecular states in comparison to that required to produce ionization. Thus, a much greater number of the gas molecules in the boundary layer flow will be excited than are ionized by the alpha particles. Since excited molecules have different transport parameters than those in the ground state, their effect on the gas-solid interface viscosity and heat transfer characteristics will also be changed. Thus it is seen the alpha bombardment of the airflow about the aerodynamic body produces a significant change in its viscosity or aerodynamic skin friction drag, with the major change being the result of molecular excitation and not ionization. Similar effects can be obtained in liquid flow but with different parameter values.

The embodiments of the invention including the alpha emitting material are the same as those illustrated in FIGS. 1–4, 6 and 7 except the alpha amitting material replaces the beta emitting layer and, since the alpha particle has two positive charges, the types of semiconductor materials and the bias polarities are the inverse of those shown. Operational control of the energy level and number of alpha particles emitted into the gas boundary layer flow is understood from the foregoing. It will also be understood that the same methods and configurations used with the positively charged alpha particle may also be used for the beta positron since it also has a positive charge.

Figure 9:
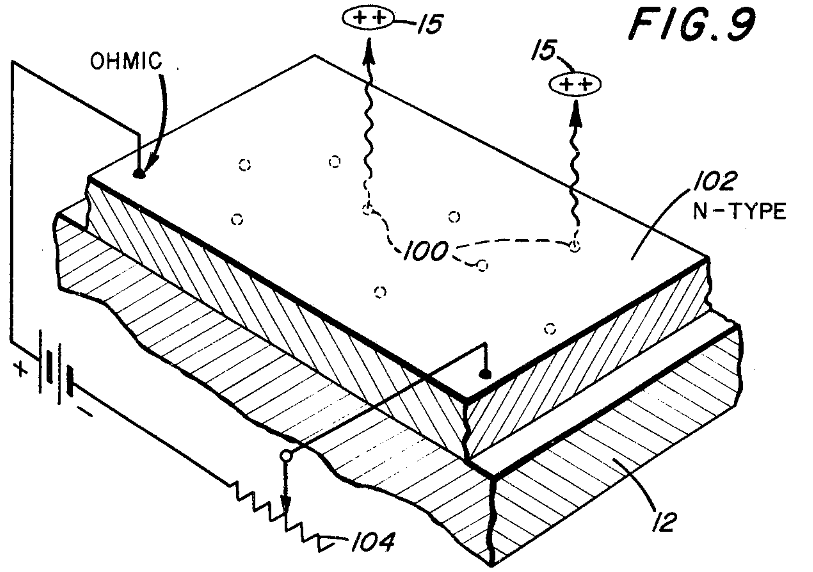
FIG. 9 is a perspective illustration of yet another embodiment of the invention.

A further embodiment for controlling the energy level of alpha particles emitted into the fluid flow about a body is shown in FIG. 9. In this embodiment the particles of radioactive isotope material 100 are slightly below or flush with the surface of the semiconductor crystal lattice 102. These radioactive particles form a type of alloy with the semiconductor surface and are held in the lattice surface by valence bond forces. One method of depositing these radioactive molecules or atoms in the surface of the semiconductor crystal lattice includes ionizing the radioactive material and using the principle of ionic bombardment to drive them into this surface. Electrochemical diffusion and other techniques known to the art may also be used to make these radioactive atoms or molecules form a part of the semiconductor crystal lattice surface. By using an N-type semiconductor material as shown in FIG. 9, a series of conduction electrons may be formed around each alpha emitting radioactive atom or molecule. The number of these conduction electrons is a function of the electron current through the semiconductor material which is controlled by rheostat 104. When and alpha particle 15 emitted by a radioactive atom or molecule embedded in the semiconductor crystal lattice, the velocity or energy level of this particle is reduced by its interaction with the electric field from the adjacent conduction electrons. The energy level and number of the alpha particles escaping into the airflow about the aerodynamic body is controlled by varying the density of these conduction electrons adjacent to the radioactive atom or molecule.

It is apparent that the configuration depicted in FIG. 9 applies to beta electron and positron emission control with suitable selection of materials and biases.

The foregoing aspect of the invention concerns the control of the energy level and number of alpha or beta particle emissions to charge the fluid characteristics. The following aspect includes variation of crystal lattice characteristics to provide a different interaction with the treated adjacent fluid flow.

As mentioned above, this invention provides the use of various combinations of fundamental phenomenon which are used to vary the energy transport between the air or gas flowing adjacent to a body and a surface of the crystal lattice of that body. This is known as the energy transport across the gas-surface interface. Any variation of the energy transport across this interface changes the local viscous forces or fluid dynamic drag and the body heat transfer characteristics, since these two parameters are intimately related. This relationship between viscosity and heat transfer was first recognized by O. Reynolds and is known as the Reynolds Analogy. With this invention, emphasis is placed on means for changing the viscosity or skin friction drag of the aerodynamic body; however, it should be borne in mind and realized that the same means may also be employed to change the heat transfer across the gas-solid interface because of the Reynolds Analogy.

The energy transport across the gas-surface interface is controlled by both the long and short range forces between the fluid species and the surface of the crystal lattice, and the long an dshort range forces of crystal lattice on the gaseous species, or different components of the crystal lattice on the various adjacent gas species. Embodiments for controlling drag by controlling radioactive emission into the fluid have been described above. Embodiments for affecting drag partly by changing the surface crystal lattice characteristics which effects a different surface interaction with the fluid will now be described.

Figures 10, 11:
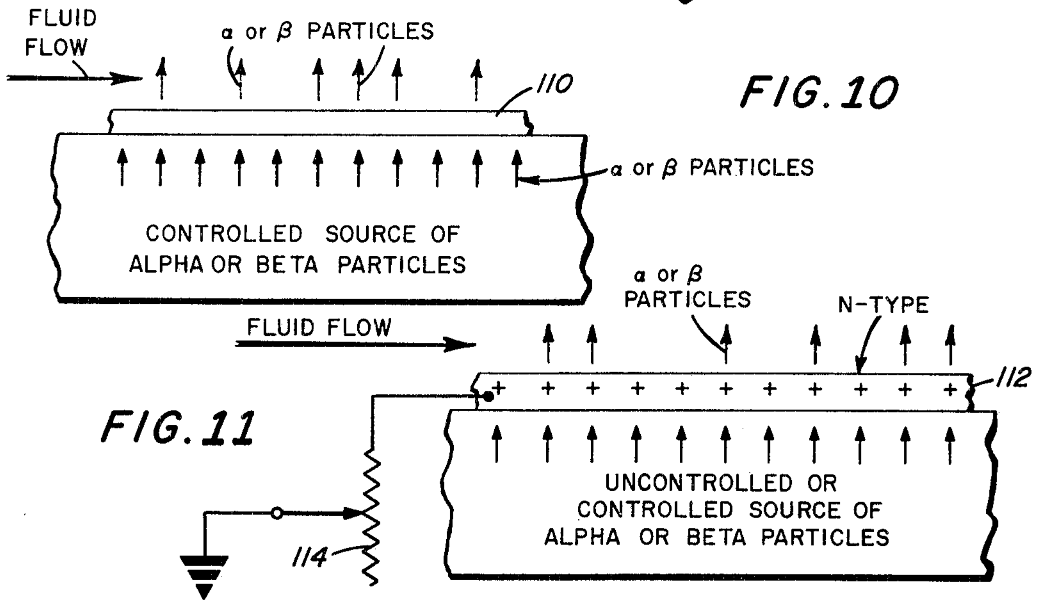
Figure 12:
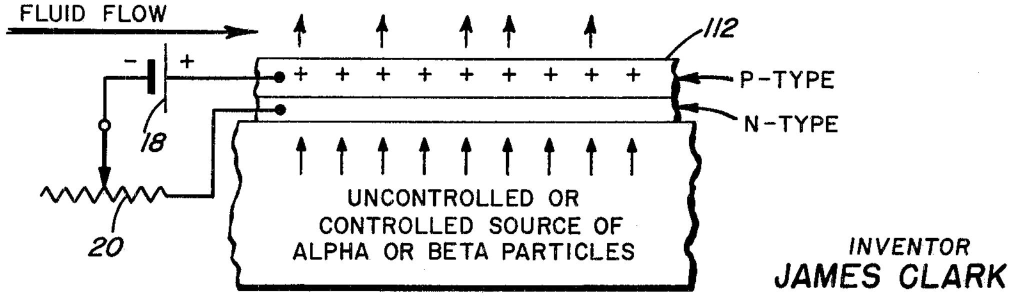

Briefly stating the aspect of the invention depicted in FIGS. 10–12, a part of the alpha or beta particles emitted from a radioactive isotope is used to bombard various types of crystal lattices causing temporary and permanent changes in their composition, properties and internal and external forces. The remaining emitted particles enter the fluid flow as described above. The inherent manner in which crystal lattice structures absorb the energy of alpha and beta particles are as follows:

(1) Ionization, or the production of ion pairs within the crystal lattice structure. This is the means whereby most of the energy of the alpha or beta particles is absorbed.

(2) Exitation of vibration within the crystal lattice structure.

(3) Production of secondary high energy electrons within the crystal lattice.

(4) Production of excitrons within the crystal lattice.

(5) Production and emission of X-rays.

(6) Radiation defects resulting from elastic collisions between the alpha or beta particles and the atoms of the crystal lattice.

In semiconductor materials, practically all of the energy of bombarding alpha and beta particles is expended in the generation of ion pairs or positive ions and their associate electrons, excitation of crystal lattice vibrations, and the production of radiation defects. In FIG. 10 there is shown a layer of material 110 adjacent to the airflow about an aero- or fluid dynamic body which is being bombarded by alpha or beta particles (positron or electron) from a controlled or uncontrolled source. If a controlled source is used, one of the embodiments described above in this disclosure may be used to obtain the energy level and number of alpha or beta particles desired. If an uncontrolled source is desired, the material being bombarded may be secured directly over a radioactive source of alpha or beta particles. The material being bombarded may have semiconductor characteristics or may be one of various types of crystal lattices having the desired characteristics after or during bombardment. The bombardment with the emission from radioactive isotopes is used to generate ion pairs and/or lattice vibrations at and immediately below the outer surface of this material which is in contact with the fluid flow. These ion pairs and/or lattice vibrations will change the long and short range forces which the outer surface of the bombarded material exerts on the adjacent molecules, ions and excited molecules in the fluid flow, thereby changing the transport parameters across this gas-solid interface.

As an alternate embodiment, the outer layer being either semiconductor material or other type of crystal lattice may be bombarded with alpha or beta particles such that no emissions result past the outer surface and into the fluid flow. This system has particular advantages for utilizing surface layer 110 as a catalytic surface, the catalysis of which can be varied by the underlying semiconductor junction bias as described.

Another embodiment of changing and controlling the forces which the crystal lattice of the outer surface of the material in contact with the airflow exerts on the airflow is shown schematically in FIG. 11. Because of the large difference in mobility between the ions and the electrons generated in the crystal lattice during ionizing bombardment, an N-type semiconductor material 112 may be bombarded and the resultant electrons, which are in the conduction band, may be bled off through a variable rheostat 114 or the substrate material. This leaves an excess of positive ions at and immediately below the outer surface in contact with the fluid flow. These ions and resulting crystal lattice vibrations will alter the forces exerted by the outer surface of the crystal lattice on the adjacent fluid flow. The inverse semiconductor material and electron charges at the outer surface may also be used as explained elsewhere in this disclosure.

Still another embodiment for changing and controlling the forces which the crystal lattice of the outer surface of a semiconductor material in contact with a fluid flow exerts on the fluid flow is shown schematically in FIG. 12. Alpha particles or beta particles (electrons or positrons) are used to generate ion pairs and crystal lattice vibrations at and immediately below the outer surface of an N-type semiconductor material. The electrons generated during the ion-pair formation are bled off through a forward-biased N-P diode junction. The remaining positive ions at and immediately beneath the outer surface of the N-type semiconductor material in conjunction with the lattice vibrations will alter the forces exerted by the outer surface of the crystal lattice on the adjacent fluid flow. The inverse semiconductor material, electric biasing connection and electron charges at the outer surface may also be used as explained elsewhere in this disclosure.

A combination of the embodiments of FIG. 12 with some of the others shown in this disclosure will permit both the excitation of the air flow and bombardment of the material forming the outer surface adjacent to the fluid flow with the same source of alpha and or beta particles.

Alpha or beta particles may also be used to bombard the outer surface of various materials exposed to a fluid flow and generate dislocations in the crystal lattice structure. These dislocations will also change the forces exerted by the crystal lattice surface on the adjacent flow.

It will be understood by those versed in the art that "battery" and "rheostat" shown schematically in the various figures of this disclosure may actually consist of any means which may be used to vary and/or control the flow of electrons and holes through the various semiconductor materials shown. The actuation of these "rheostats" or other means of control may consist of one or more of the following types: manual, automatic, servo-system, computer, etc. It will also be understood that various combinations of the elemental configurations illustrated and described in this disclosure may be used to obtain various desired drag and heat transfer characteristics.

What is claimed is:

1. A system for controlling the drag characteristics of a solid body moving in a fluid flow comprising a layer of radioactive material coated on the surface of the body to emit charge particles into the fluid flow, layers of P-type and N-type material disposed on the layer of radioactive material between said last-mentioned layer and the fluid flow and forming a P-N junction and adjustable biasing means connected to said layers of P-N material to selectively forward and reverse bias the same to control the number and energy level of the emissions from the radioactive layer into the fluid flow.

2. A system as set forth in claim 1 wherein the bias means and layers of semiconductive material are arranged such that the flow of biased current across the forward biased P-N junction is in the same direction as the similarly charged emissions to the fluid flow.

3. A system as set forth in claim 1 wherein the bias means and semiconductive layers are arranged such that the bias current across the P-N junction when forward biased is in the opposite direction of the similarly charged emissions to the fluid flow.

4. A system as set forth in claim 1 wherein only two layers of semiconductive material are provided between the layer of radioactive material and the fluid flow.

5. A system as set forth in claim 1 wherein a third semiconductor layer is arranged with the first two mentioned semiconductor layers in alternating semiconductor material types to form two P-N junctions spaced between the layer of radioactive material and the fluid flow and the adjustable bias means biasing the three semiconductor layers so as to have emitter-base-collector characteristics for controlling the emissions crossing the junctions thereof and emitting to the fluid flow.

6. A system for controlling the drag characteristics of a solid body moving through a fluid flow comprising a layer of radioactive material held to the surface of the body to emit charged particles into the fluid flow, a layer of field effect transistor means disposed between the radioactive layer and the fluid flow such that the emissions pass through said field effect transistor means, and adjustable biasing means coupled to the gates of the field effect transistor means to control the number of the emissions moving therethrough and into the fluid flow.

7. The system of claim 6 wherein said field effect transistor means includes a layer of semiconductor material of one type, and said gates comprising a plurality of spaced zones of semiconductor material of the opposite semiconductor type and an electrically conductive source layer contacting the face of said semiconductor layer nearest the solid body and said bias means being coupled to said source layer and said plurality of gates.

8. A system as set forth in claim 1 wherein said layers of semiconductor material include crystal lattices having generally parallel axes arranged to absorb substantial quantities of emissions emitted in directions other than generally perpendicular to the surface of the solid body.

9. A system as set forth in claim 8 wherein the portion of the semiconductor layer nearest the radioactive material layer includes a portion nearest said ratioactive layer to absorb a portion of the energy from the emissions eminating from the radioactive layer prior to their reaching the P-N junction.

10. A system for controlling the drag characteristics of a solid body moving through a fluid flow including a layer of semiconductor material arranged on the surface of a solid body and having one face exposed to the fluid flow, a plurality of radioactive zones arranged in space relationship near said one face of said semiconductor layer to emit charged particles in the direction generally away from the solid surface into the fluid flow and adjustable bias means coupled to two spaced locations of the semiconductor layer for establishing a controlled current sheet between said spaced locations and within said semiconductor layer disposed generally parallel with the local body surface so as to control the number and energy level of the charged particles emitting into the fluid flow.

11. A system as set forth in claim 1 wherein a further layer of semiconductor material is positioned between the outer-most set of layers of semiconductor material and the fluid flow and adjustable means for carrying away controlled quantities of excess charges from said further layer of semiconductor material resulting from the emissions passing therethrough.

12. A system as set forth in claim 11 wherein said adjustable means includes a variable resistance connected to ground.

13. A system as set forth in claim 11 wherein an additional semiconductor layer of opposite type from said further layer is arranged to form a further P–N junction therewith and said adjustable means includes second adjustable biasing means connected to control the conduction and cut-off condition of said further P–N junction.

14. A system for controlling the drag characteristics of a solid body moving in a fluid flow comprising a layer of radioactive material coated on the surface of the body to emit charged particles in a direction toward the fluid medium, layers of P-type and N-type material disposed on the layer of radioactive material between said last-mentioned layer and the fluid flow and forming a P–N junction and adjustable biasing means connected to said layers of P–N material to selectively forward and reverse bias the same to control the number and energy level of the emissions from the radioactive layer through said semiconductor layer, and a further layer of material positioned between the outermost set of semiconductor layers and the fluid flow which is bombarded with and absorbs substantially all emissions passing through said semiconductor layers.

15. The system of claim 14 wherein said further layer comprises a catalytic surface the catalysis of which is varied in response to adjustment of said biasing means.

16. The system of claim 14 wherein said further layer comprises a semiconductor material.

17. The system of claim 14 wherein said further layer comprises a type of crystal lattice other than semiconductor material.

References Cited

UNITED STATES PATENTS

| | | | |
|---|---|---|---|
| 2,640,158 | 5/1953 | Hicks | 250—106 |
| 2,976,426 | 3/1961 | Rappaport | 250—106 |
| 3,257,570 | 6/1966 | Dehmelt et al. | 310—3 |
| 3,374,830 | 3/1968 | O'Sullivan | 165—96 |
| 3,422,263 | 1/1969 | Asahina | 250—106 |

MILTON BUCHLER, Primary Examiner

J. E. PITTENGER, Assistant Examiner

U.S. Cl. X.R.

114—67; 250—106; 313—108; 317—262